UNITED STATES PATENT OFFICE.

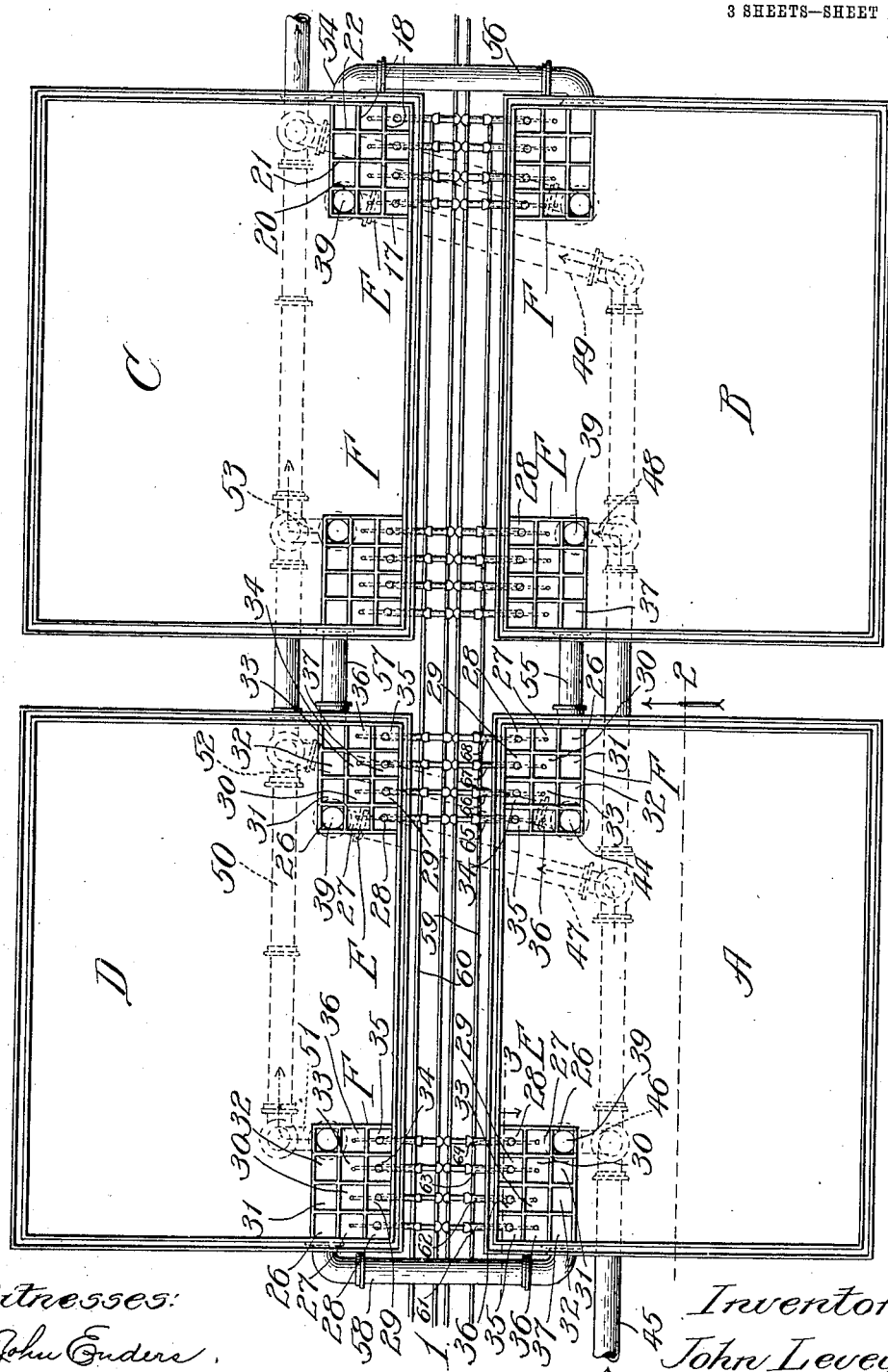

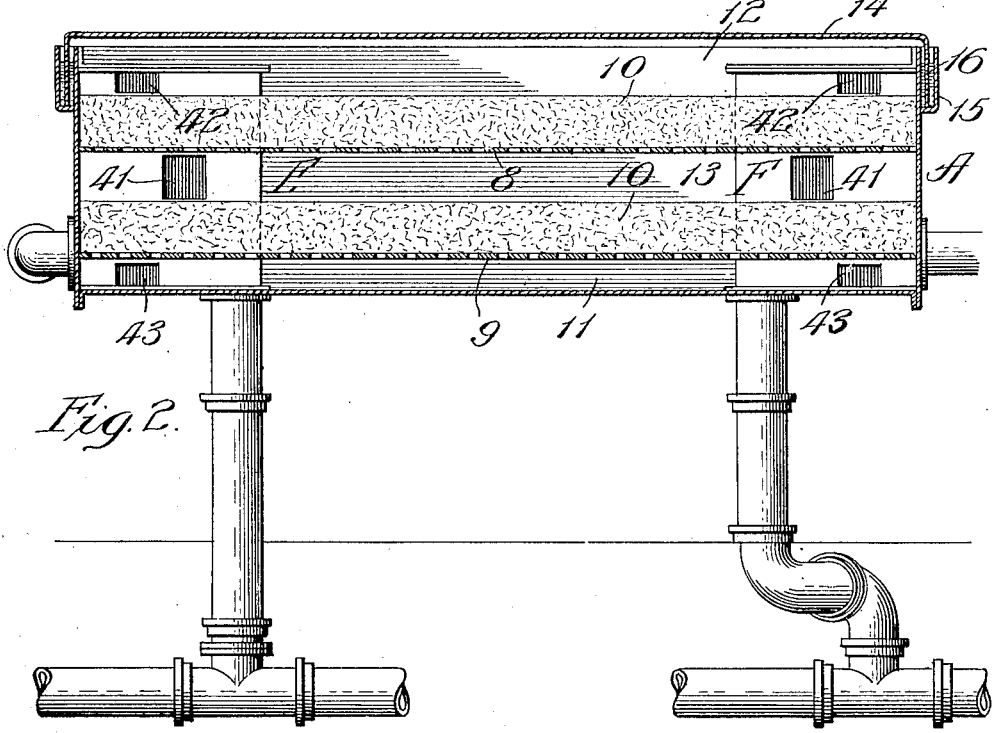
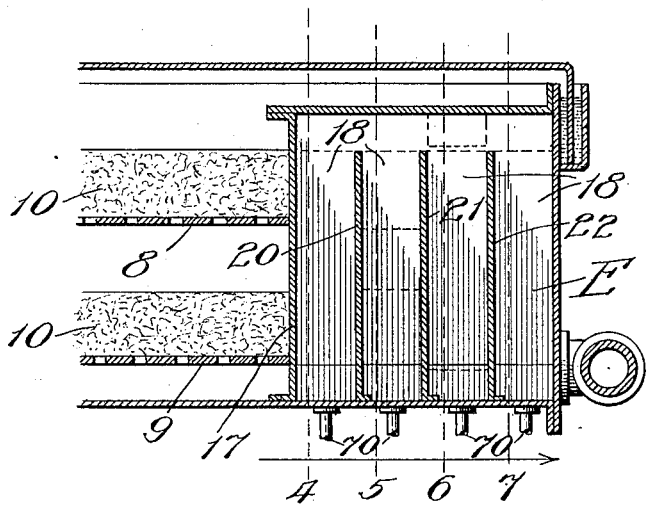

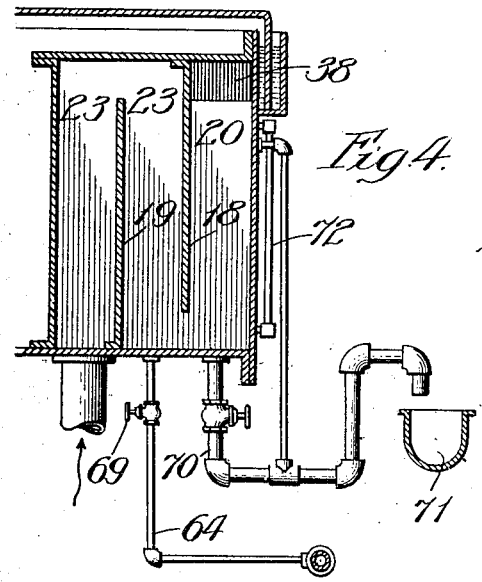
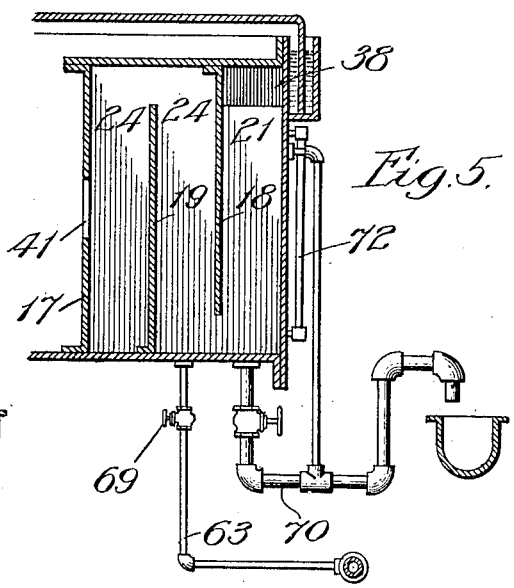
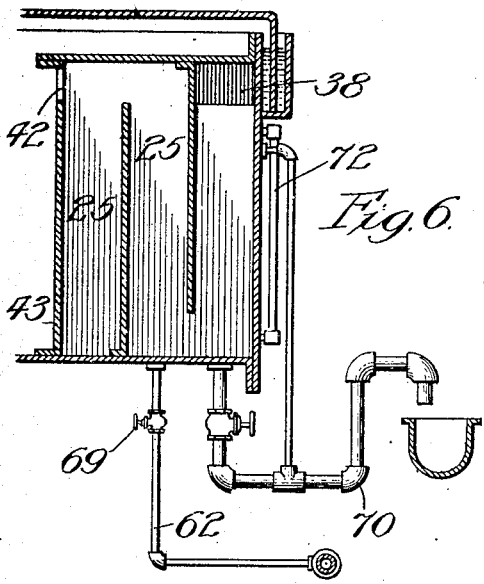
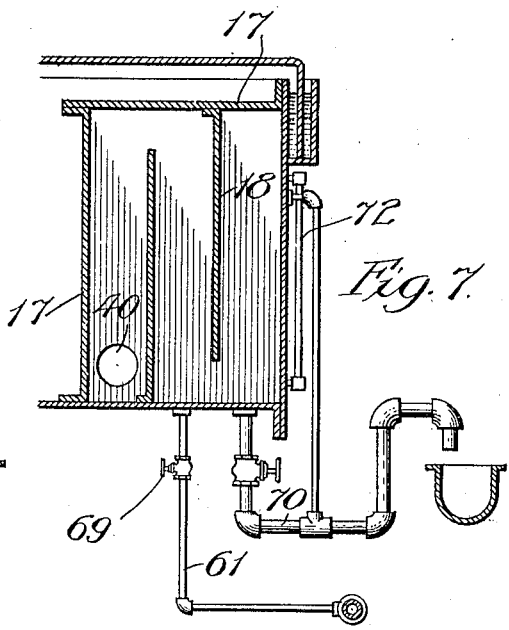

JOHN LEVEY, OF CHICAGO, ILLINOIS, ASSIGNOR TO JOHN WILLIAMSON, OF CHICAGO, ILLINOIS.

GAS-PURIFYING APPARATUS.

No. 912,694.  Specification of Letters Patent.  Patented Feb. 16, 1909.

Application filed August 21, 1908. Serial No. 449,602.

*To all whom it may concern:*

Be it known that I, JOHN LEVEY, a citizen of the United States, residing at Chicago, in the county of Cook and State of Illinois, have invented a new and useful Improvement in Gas-Purifying Apparatus, of which the following is a specification.

My invention relates to an improvement in apparatus for purifying gas, and more particularly illuminating gas, as the last stage of the process in manufacturing gas in relatively large quantities. Apparatus for this purpose commonly consists of a series of large tanks, or boxes, each containing an oxid compound through which the gas, under relatively low pressure, is caused to pass for separating from it its contained impurities, it being the common practice to so dispose the oxid on perforated trays as to provide spaces or chambers above, below and between the layers of oxid to permit the gas to pass either into the space between the layers and thence through the oxid into the spaces above and below the layers, or vice versa, from which space or spaces, as the case may be, the gas passes to the next succeeding box and on through the remaining boxes of the series, from the last one of which the gas is discharged into the mains for distribution. The gas to be purified is conducted to each box of the series by a relatively large pipe, oftentimes of a diameter approximating thirty inches, in order that the desired volume of gas, while under low pressure, may flow into the boxes.

The gas in passing through the boxes, in time, so thoroughly impregnates the oxid of the first box into which the gas is introduced, that it necessitates the removal of the oxid, which is effected by workmen who shovel it from the trays, the gas for purification during this operation being diverted from the box being cleaned and flowing through the remaining boxes.

Hitherto, so far as I am aware, the gas for purification has been controlled in its passage through the boxes, and from one box to the other, by means of valve mechanism interposed in the relatively large gas conduits referred to, thereby necessitating the use of very large valves. The action of the gases on these valves causes them to oxidize and rust, thereby not only causing them to stick, making their operation very difficult and oftentimes requiring as many as four men to operate them, but rendering them leaky, with the result of flooding with gas the box being emptied of its oxid and oftentimes overcoming the men.

My object is to overcome the disadvantages of apparatus of this character as hitherto provided, to the end of rendering the means for controlling the flow of gas through each box, and from one box to another, easy of manipulation, and of avoiding danger of escape of gas into a box while it is being cleaned, this purpose being accomplished by the employment of a system of separately controllable water-seals for regulating the flow of gas.

Referring to the accompanying drawings—Figure 1 is a plan view of a gas-purifying apparatus employing a plurality of gas-purifying boxes in series and embodying my invention, the covers for the boxes being omitted; Fig. 2 is an enlarged section taken at the line 2 on Fig. 1 and viewed in the direction of the arrow; Fig. 3 is a broken section taken at the line 3 of Fig. 1 and viewed in the direction of the arrow; and Figs. 4, 5, 6 and 7, sections taken at the lines 4, 5, 6 and 7, respectively, on Fig. 3 and viewed in the direction of the arrow.

In the particular apparatus illustrated, four gas-boxes or gas-purifying tanks A, B, C and D are shown, each of these boxes containing an upper and a lower perforated tray 8 and 9 respectively, spaced from each other and the top and bottom of the boxes, and upon which trays the oxid represented at 10, the composition of which is well known in this art, is superposed to form spaced layers of suitable material for removing the impurities from the gas. The trays are so arranged as to afford a lower horizontally disposed chamber 11 below the tray 9, a similar upper chamber 12 above the oxid on the tray 8, and a similar intermediate chamber 13 between the tray 8 and the oxid on the tray 9. As is usual in constructions of this character, a water-seal for the cover 14 of each box is provided, a trough 15 extending about the exterior of each of the boxes into which the depending flanges 16 of the covers 14 extend.

The apparatus illustrated is so constructed as to permit the gas to be purified to pass through any one of the boxes alone, or through any number of boxes beginning with any one of them, and in its course through the boxes to be caused to flow in the desired direction. For this purpose I provide in each gas-box two water-seal boxes E and F each of which comprises a gas-tight casing 17 containing two longitudinally extending spaced upright partitions 18 and 19, the first of which has gas-tight connection with the top and sides of the casing 17 and is spaced from the bottom thereof, as represented, and the other of which has gas-tight connection with the bottom of the casing and the sides thereof, and is spaced from the top; spaced partitions 20, 21 and 22 extending transversely of the casing 17 from its bottom to near its top interposed between the partition 18 and the adjacent side of the casing 17 to have gas-tight connection with the casing and the partition 18; and spaced upright partitions 23, 24 and 25 extending transversely of the casing 17 from the top of the latter to its bottom, between the partition 18 and the opposite side of the casing and intersecting the partition 19, the partitions 23, 24 and 25 having gas-tight connection at their edges and top and bottom portions with the casing and the partitions 18, 19, 20, 21 and 22.

The foregoing described partitions are so arranged in the casing 17 as to provide, in the construction illustrated, twelve cells 26 to 37 inclusive, of approximately equal cross-sectional area, and a chamber 38 extending from end to end of the casing 17 above the top portions of the partitions 20, 21 and 22.

The water-seal boxes E in each gas-box controls the introduction into the latter of the gas and its course through the respective gas-boxes, and the water-seal boxes F of each gas-box controls the discharge of gas from them. Each of the water-seal boxes E contains an opening 39 through its bottom, communicating with the cell 26, an opening 40 through its casing-wall, communicating with the cell 37; an opening 41 through its casing-wall intermediate the top and bottom of the casing, and communicating with the cell 31, and upper and lower openings 42 and 43 connecting, near the top and bottom of the casing, with the cell 32, it being understood that the opening 41 registers with the chamber 13, and that the openings 42 and 43 register with the upper and lower chambers 12 and 11 respectively. Each of the water-seal boxes F has an opening 44 in its bottom connecting with the cell 37; an opening (not shown) in its side wall communicating with the cell 26; and openings like the openings 41, and 42 and 43 communicating with its cells 31 and 32 respectively.

In the apparatus illustrated, the main for conducting gas to be purified is represented at 45 and leading from this main are four branch pipes 46, 47, 48 and 49 which connect, respectively, with the openings 39 in the water-seal boxes E located in the respective gas-boxes A, B, C and D, as represented. The gas-outlet main is represented at 50, and has four branch pipes 51, 52, 53 and 54 connected respectively with the openings 44 in the water-seal boxes F of the respective gas-boxes A, B, C and D. Gas-conducting pipes 55, 56, 57 and 58 connect the cells 26 of the boxes F with the cells 37 of the boxes E, as illustrated, for a purpose hereinafter disclosed.

The control of the gas through the boxes A, B, C and D is regulated by water-seals produced in the boxes E and F, and for this purpose I provide two water mains 59 and 60, with a set of branch pipes for each of the water-seal boxes E and F. The pipes for each of the water-seal boxes E are represented at 61, 62, 63 and 64, these pipes opening respectively through the bottoms of the boxes into the cells 35, 34, 29 and 28 respectively; and the pipes for each box F, which are represented at 65, 66, 67 and 68 open through the bottoms of these boxes into the cells 35, 34, 29 and 28 respectively, the passage of water through these pipes being separately controlled by valves 69.

In the use of the apparatus it is necessary that the water-seals be destroyed from time to time by draining certain of the cells of the water contained therein, and for this purpose I provide each cell 27, 30, 33 and 36 with a valved drain-pipe 70 which empties into a centrally disposed trough 71.

The operation of the apparatus is as follows: Assuming the boxes A, B, C and D to contain fresh oxid and the desired course of the gas through each gas-box to be from the center thereof through the chamber 13 and up and down through the oxid and thence out of the upper and lower chambers 12 and 11, the cells 33, 34, 35 and 36 of the box E of box A, the cells 33, 34, 35 and 36 of the box F of the gas-boxes A, B and C; the cells 33, 34, 27 and 28 of the water-seal boxes E of the gas-boxes B, C and D; and the cells 27, 28, 33 and 34 of the water-seal box F of the box D are filled with water short of the tops of the partitions 20, 21 and 22, by operating the valves controlling the flow of water through the branch water-pipes leading to these cells as described, water-gages 72 being provided for gaging the filling. The course of the gas through the boxes will then be as follows: The gas flows from the pipe 45 into the branch 46, thence into the cell 26 of the water-seal box E of the box A, over the partition 19 into the cell 27, thence under the partition 18, through the cell 28, and into the chamber 38. From this chamber it passes downward through the chamber 29, thence under the partition 18, through the chamber 30, over the partition 19 and into the cell 31, from which it discharges at the opening 41 into the gas-box chamber 13. The gas is then free to pass upward and downward through the oxid on the trays 8 and 9 and into the chambers 11 and 12. From these chambers the gas flows into the cell 31 of the box F of the box A through the openings 42 and 43, thence over the partition 19 into the cell 30, under the partition 18, through the cell 29, from which it discharges into the chamber 38 of this water-seal box. The gas passes through this chamber to and downwardly through the cell 28, under the partition 18, upward through the cell 27, over the partition 19 and downward through the cell 26 into the pipe 55. The gas then flows to the water-seal box E of the box B through which it courses as follows: The gas in passing from the pipe 55 enters the cell 37, passes over the partition 19, downward through the cell 36, under the partition 18, upward through the cell 35 and thence into the chamber 38 of this water-seal box. From this chamber it passes downward through the cell 29, under the partition 18, upward through the cell 30, over the partition 19 and downward through the cell 31, the gas discharging through the opening 41 of this last-referred to cell into the chamber 13 of the gas-box B.

The course of the gas through the gasbox B is the same as that described of the box A, the gas discharging from the chambers 12 and 11 into the cell 31, through its openings 42 and 43, of the water-seal box F of the box B. The course of the gas through this water-seal box is the same as that described of the box F of the box A. The gas continues to flow through the remaining boxes of the series, as described of the other boxes, until it reaches the water-seal box F of the box D. The water-seals established in the water-seal box F of the box D are such as to cause the gas to flow from the chambers 11 and 12 of the box D into the chamber 38 of this water-seal box, as described of the water-seal box F of the box A, but instead of passing through this waterseal box to another water-seal box, it is caused to discharge into the outlet-main 50 by passing from the chamber 38 of the box F downward through the cell 35, under the partition 18, upward through the cell 36, over the partition 19 and downward through the cell 37 to the pipe 51. The gas in traveling through the gas-boxes as described is thus caused to be purified for use. After the gas has flowed for a time through these boxes as described, depending upon the amount of impurities contained in the gas, that portion of the oxid of box A with which the gas first comes in contact, becomes so thoroughly impregnated with impurities as to render change in the direction of the flow of gas through this box necessary—in other words, instead of passing the gas into the central chamber 13 and thence out through the chambers 11 and 12, the gas should be passed into the chambers 11 and 12 and thence out of the chamber 13. To effect this reversal of flow, it is necessary to destroy the water-seals in the cells 33 and 34 of the water-seal box E of the box A, and the waterseals in the cells 33 and 34 of the water-seal box F, and substitute for these seals waterseals in the cells 29 and 30 of each of the boxes E and F of the box A. It will thus be understood that the gas will then be caused to flow from the water-seal box E of the box A through the openings 42 and 43 into the upper and lower chambers 12 and 11 of the box A, thence through the oxid to the intermediate chamber 13, from which it discharges into the opening 41 of the box F. The flow of gas through this last-referred to box will thus be such as to cause it to discharge through the pipe 55 into the water-seal box E of the box B, from which box E and the remaining boxes B, C and D it courses in the manner first hereinbefore described. When the oxid of box A becomes so thoroughly impregnated with the impurities of the gas as to render the recharging of this box necessary, the gas is caused to be diverted from this box, the gas then passing through the boxes B, C and D only, as described. The box A is cut out of the circuit by causing a water-seal as described to be established in the cells 27 and 28, by permitting water to flow through the pipe 64 into these cells, thereby preventing any gas from passing out of the water-seal box E into the box A. To permit admission of the gas from the main 45 to the box B, I destroy the water-seal in the cells 27 and 28 of this water-box and establish a water-seal in the cells 35 and 36 thereof. This waterseal box will then have its cells 33, 34, 35 and 36 filled with water to prevent the passage of gas through them. With these water-seals established in the box E of the box B, the gas from the main 45 passes through the cells 26, 27 and 28 to the chamber 38, and thence through the cells 29, 30 and 31 into the chamber 13 of the box B, the gas passing through the oxid and into the water-seal box F of this gas-box, through which it discharges as hereinbefore described. The course of the gas through the remaining boxes C and D is that hereinbefore described.

It will be understood that the water-seals are destroyed, as described, by causing the water to flow by gravity therefrom into the valved pipes 70, through which it discharges into the trough 71. To prevent the escape of gas through these pipes 70, I form each of the latter with a triple elbow, as clearly illustrated in Figs. 4, 5, 6 and 7, the extremity of each of these pipes terminating above its connection with the respective boxes E and F, whereby a column of water is constantly maintained in the pipe 70.

After the gas-box A has been recharged with oxid it may again be included in the gas circuit as the first box through which the gas should pass, in which case water-seals as hereinbefore first described may be established in the water-seal boxes E and F of this box A; or it may be the last through which the gas is caused to pass, the latter being the preferred arrangement. In this last case water-seals in the water-seal boxes F and E of the gas-boxes D and A respectively should be established to prevent the escape of gas from this water-seal box F into the pipe 50, and instead pass it through the pipe 58 to this water-seal box E of the box A, thence through it and out of its cell 31 into the chamber 13, thence through the oxid and into the chambers 11 and 12. As the gas would be discharged from the box A, it is necessary to establish water-seals in the cells 27, 28, 29 and 30 of the water-seal box F of this gas-box, which would thus permit the gas to discharge through the pipe 52 into the outlet-main 50.

From the foregoing described operation of the apparatus, it will be readily understood that by establishing the desired water-seals in the various boxes E and F, not only may the course of the gas through any particular box be established as desired, but the gas may be caused to flow through any number of boxes in succession or through any single one and be discharged from any one of the boxes into the outlet-main 50. It will also be understood that it is not indispensable that the boxes E and F be located within the respective boxes A, B, C and D, as they may be positioned exterior of them and be connected thereto by suitable pipe-connections.

By providing a system of water-seals for effecting the control of the gas in the gas-boxes and in each separate one, the use of valves in the gas-mains, or conduits, is rendered unnecessary and thus the disadvantages hereinbefore noted, as arising from the use of constructions in which the valves are provided in the conduits, are avoided. Furthermore, escape of gas from the supply-main into any one of the gas-boxes sealed from it, is positively avoided, as there is no opportunity for escape of the gas when a water-seal for this purpose has been established.

While I have specifically defined the boxes E and F to be water-seal boxes, I do not wish to be understood as limiting my invention to the use of water, as a sealing means, as any other suitable liquid may be employed.

What I claim as new, and desire to secure by Letters Patent, is—

1. In a gas-purifying apparatus, the combination with a gas-purifier box containing a plurality of layers of porous gas-purifying material, of means for controlling the direction of gas-flow through the box, comprising a set of gas-tight casings interposed in the course of the gas-flow to and from said box and formed with a series of cells communicating respectively with the gas inlet and outlet pipes and the spaces above and below and between said layers and affording a series of liquid-receptacles in the path of the gas-flow, all so constructed and arranged that each receptacle may be separately charged with liquid to change the course of the gas-flow, for the purpose set forth.

2. In a gas-purifying apparatus, the combination with a gas-purifier box containing a plurality of layers of porous gas-purifying material so disposed as to afford spaces above and below each layer, of means for controlling the direction of gas-flow through the box, comprising a set of gas-tight casings interposed in the course of the gas-flow to and from said box and formed with a series of cells, one cell of each casing communicating near its top and bottom with the space above the top layer of gas-purifying material and the space below the bottom layer thereof, another cell of each casing communicating with the space between said layers, and another cell of each of said casings communicating respectively with the inlet and discharge to and from the box, these cells affording a series of liquid-receptacles interposed in the path of the gas-flow, all so constructed and arranged that each receptacle may be separately charged with liquid to change the course of the gas-flow, for the purpose set forth.

3. In a gas-purifying apparatus, a liquid-seal box for the purpose set forth, comprising a gas-tight casing containing a plurality of spaced partitions extending from the top to the bottom of the casing, a series of spaced partitions intersecting said first-named partitions, one of which extends from the bottom of the casing to near its top, and the other from the top of the casing to near its bottom, portions of said first-named partitions being cut away between the partition which reaches short of the bottom of the casing and the adjacent side of the casing, said partitions forming a series of cells affording passages of convoluted form opening into each other and adapted to separately receive liquid for closing any one or more of them, with openings through the casing communicating with said passages, for the purpose set forth.

4. In a gas-purifying apparatus, a liquid-seal box for the purpose set forth, comprising a gas-tight casing containing a plurality of spaced upright partitions extending from the top of the casing to its bottom, a series of spaced partitions intersecting said first-named partitions, one of which extends from the bottom of the casing to near its top, and the other from the top of the casing to near its bottom, portions of said first-named partitions being cut away between the partition which reaches short of the bottom of the casing and the adjacent side wall, said partitions forming a series of cells affording passages of convoluted form opening into each other at their tops and adapted to separately receive liquid for closing any one or more of them, the casing being provided with upper, lower and intermediate apertures opening into said passages, for the purpose set forth.

5. In a gas-purifying apparatus, the combination with a series of gas-boxes each containing a plurality of layers of porous gas-purifying material, spaced from each other to afford a space above the uppermost layer, a space below the lowermost layer and a space between said layers, a main leading from the source of gas supply, and an outlet main for receiving the gas after it has been purified, of means for controlling the flow of gas through said series of boxes comprising an inlet and outlet liquid-seal box for each of said gas-boxes, each said liquid-seal box containing a series of gas-passages with liquid-receptacles interposed in each of said passages, the inlet liquid-seal box of each of said gas-boxes having one of its gas-passages connected with the gas-inlet main, another of its passages connected with the spaces above the uppermost layer and below the lowermost layer, another of its gas-passages connected with the space between said layers, and the other of its passages connected with an outlet from the next preceding box of the series, and the outlet liquid-seal box of each gas-box having one of its passages connected with the outlet main, another of its passages connected with the spaces above the uppermost layer of gas-purifying material and below the lowermost layer of gas-purifying material, another of its passages connected with the space between said layers, and the other of its passages connected with the inlet liquid-seal box of the next succeeding gas-box of the series, all being so constructed and arranged that the gas may be caused to be diverted from any one or more of said boxes and discharged from any of said boxes, and the direction of gas-flow through said layers may be reversed by charging the receptacle or receptacles controlling the passage or passages leading to the box or boxes against the gas-flow or the receptacles controlling the inlets and outlets to the spaces provided between the layers and the gas-box.

6. In a gas-purifying apparatus, the combination with a plurality of gas-boxes connected together in series and each containing a plurality of layers of porous gas-purifying material, of means for controlling the direction of gas-flow through said boxes and diverting the gas to be purified from any one or more of said boxes, comprising a set of gas-tight casings interposed in the course of the gas-flow to and from said box and formed with a series of cells communicating respectively with the gas inlet and outlet pipes and the spaces above and below and between said layers, and affording a series of liquid receptacles in the path of the gas-flow, all so constructed and arranged that each receptacle may be separately charged with liquid to change the course of the gas-flow through any one or more of said boxes, and to divert the gas to be purified from any one or more of said boxes, for the purpose set forth.

JOHN LEVEY.

In presence of—
L. G. KIRKLAND,
J. G. ANDERSON.